US012318867B1

(12) United States Patent
Cui (10) Patent No.: US 12,318,867 B1
(45) Date of Patent: Jun. 3, 2025

(54) LASER-PLASMA COMPOSITE CLADDING HEAD AND COMPOSITE CLADDING METHOD

(71) Applicant: Ocean University of China, Qingdao (CN)

(72) Inventor: Hongzhi Cui, Qingdao (CN)

(73) Assignee: Ocean University of China, Qingdao (CN)

( * ) Notice: Subject to any disclaimer, the term of this patent is extended or adjusted under 35 U.S.C. 154(b) by 0 days.

(21) Appl. No.: 18/958,511

(22) Filed: Nov. 25, 2024

(30) Foreign Application Priority Data

Jan. 26, 2024 (CN) .......................... 202410113444.X (51) Int. Cl.
| | |
|---|---|
| *B23K 26/348* | (2014.01) |
| *B23K 10/02* | (2006.01) |
| *B23K 26/064* | (2014.01) |
| *B23K 26/067* | (2006.01) |
| *B23K 26/14* | (2014.01) |
| *B23K 26/342* | (2014.01) |
| *B23K 26/70* | (2014.01) |
| *C23C 24/10* | (2006.01) |

(52) U.S. Cl.
CPC .......... *B23K 26/348* (2015.10); *B23K 10/027* (2013.01); *B23K 26/064* (2015.10); *B23K 26/0676* (2013.01); *B23K 26/1423* (2013.01); *B23K 26/342* (2015.10); *B23K 26/703* (2015.10); *C23C 24/106* (2013.01)

(58) Field of Classification Search
CPC . B23K 26/342; B23K 26/348; B23K 26/0734
See application file for complete search history.

(56) References Cited

U.S. PATENT DOCUMENTS

2015/0053656 A1* 2/2015 Popp ...................... B23K 28/02
219/121.48

FOREIGN PATENT DOCUMENTS

CN 112593229 A * 4/2021

OTHER PUBLICATIONS

CN 112593229 A (Fan, Ping-Yi et al.) Apr. 2, 2021 [retrieved on Apr. 2, 2025]. Retrieved from Foreign Image and Text database, translation by Clarivate Analytics (Year: 2021).*

* cited by examiner

*Primary Examiner* — Steven W Crabb
*Assistant Examiner* — Theodore J Evangelista
(74) *Attorney, Agent, or Firm* — Tutunjian & Bitetto, P.C.

(57) ABSTRACT

This application relates to a laser-plasma composite cladding head and a composite cladding method, and belongs to the field of surface processing of metallic materials. In the laser-plasma composite cladding head of this application, a ring laser beam is split into two half-ring laser beams through an upper roof lens to avoid a tungsten electrode. The two half-ring laser beams pass through a left 45° reflective lens to be coaxial with the tungsten electrode and then are integrated into a complete ring laser beam through a lower roof lens, thereby allowing a coaxial output of the ring laser beam and a plasma beam. This application integrates the advantages of laser cladding and plasma cladding and adopts coaxial compounding and synchronous powder-feeding.

10 Claims, 4 Drawing Sheets

LASER-PLASMA COMPOSITE CLADDING HEAD AND COMPOSITE CLADDING METHOD

CROSS REFERENCE TO RELATED APPLICATION

This patent application claims the benefit and priority of Chinese Patent Application No. 202410113444X, filed with the China National Intellectual Property Administration on Jan. 26, 2024, the disclosure of which is incorporated by reference herein in its entirety as part of the present application.

TECHNICAL FIELD

The present disclosure relates to a laser-plasma composite cladding head and a composite cladding method, and belongs to the technical field of surface processing of metallic materials.

BACKGROUND

In the fields such as marine equipment, aerospace, rail transit, energy, and military industry, a large number of devices and key components, especially non-ferrous metal components such as copper, aluminum, magnesium, and titanium, work under extreme working conditions such as corrosion, wear, ablation, heavy load, and high speed. With the wide application of structural light-weighting, multi-functionality, or the like, advanced requirements have been put forward for the low hardness, wear resistance, and high-temperature-damage resistance of the above components. However, when the laser cladding is adopted for strengthening, there are low heating and preparation efficiencies due to a low laser absorption rate. The application of plasma cladding for strengthening is limited due to problems such as a small cladding depth and a large deformation.

Currently, there are many reports on improving a preparation efficiency of a cladding layer and effectively reducing a deformation.

The Chinese patent 202210274501.3 discloses an additive manufacturing method based on plasma-laser composite cladding. In the additive manufacturing method, the plasma cladding first and then the laser cladding are conducted circularly on a surface of a workpiece to produce a surface layer where a wavy wear-resistant belt strongly binds to a stainless-steel soft adhesive belt and the soft and hard phases are staggered, which can effectively reduce a residual stress between the wear-resistant belt and the adhesive belt to allow strong binding and thus improve the wear resistance, impact resistance, corrosion resistance, and resistance to a corrosive wear electromechanical coupling damage for the surface of the workpiece.

The Chinese patent 2020114724061 discloses a plasma-laser composite cladding system, including: a worktable, a plasma cladding machine, a plasma generator, a laser head, or the like. Although a laser beam and a plasma beam are separated in the plasma-laser composite cladding system, the two beams are fed into a molten pool simultaneously, which reduces a thermal stress and improves an accuracy and efficiency of coating forming.

The Chinese patent 2017100669851 discloses a welding torch for laser beam-plasma arc hybrid welding, including a cavity through which a laser beam passes. A compression nozzle is provided at a lower end of the cavity of the welding torch, and a plasma electrode forms a slit above the compression nozzle of the welding torch. A part of a laser beam is incident on an edge of the slit of the electrode, and a part of the laser beam is focused on a workpiece after passing through the slit. Under heating by laser beam radiation, the electrode causes gas ionization, such that a plasma arc is first produced between the electrode and the compression nozzle. The plasma arc is compressed by the compression nozzle, and then a compressed plasma arc is established between the compression nozzle and the workpiece. A laser beam passing through the compression nozzle is focused and interacts with the compressed plasma arc to produce a plasma-laser discharge, such that the compressed plasma arc is further contracted and a welding point with a high energy density is produced on the workpiece under a combined action of a further contracted plasma arc and the laser beam. The welding torch eliminates the defects of laser beam welding and plasma welding, and has a higher composite heat source coupling efficiency than the conventional laser beam-arc hybrid welding. However, the welding torch, as a welding structure, cannot allow a powder-feeding function required for cladding.

The Chinese patent 2022105544088 discloses a laser-plasma composite manufacturing nozzle, including: a nozzle body with a light/powder co-channel running through the nozzle body, where an end of the light/powder co-channel is connected with an optical path system; the light/powder co-channel includes a main light/powder co-channel and an expanded light/powder co-channel that are arranged along an axial direction of the nozzle body; and one end of the expanded light/powder co-channel communicates with a light outlet of the optical path system, and the other end of the expanded light/powder co-channel communicates with an end of the main light/powder co-channel, so as to form a coaxial and through light/powder co-channel; a powder-feeding channel arranged at two sides of the nozzle body, where an inlet of the powder-feeding channel is connected with a powder-feeding system, and an outlet of the powder-feeding channel communicates with the expanded light/powder co-channel; and an electrode, where two ends of the electrode are connected with positive and negative electrodes of a direct-current power supply, respectively. A smooth deposited layer generated from plasma cladding makes up for the shortcoming of a large undulation of a surface of a laser cladding-deposited layer. In addition, the advantage of excellent binding between a metal powder of laser cladding and a workpiece makes up for the shortcoming of poor binding caused by a low forming temperature of plasma cladding.

The Chinese patent 201811361922X discloses a laser+plasma arc+tungsten inert gas (TIG) arc combined welding method, including an independent laser beam, plasma arc, and TIG arc. When the combined welding method is used to butt-joint stainless-steel sheets without beveling, movement speeds of the laser beam, the plasma arc, and the TIG arc are the same, and relative positions of the laser beam, the plasma arc, and the TIG arc do not change. The laser beam is arranged in the front, the plasma arc is arranged in the middle, and the TIG arc is arranged in the back. The laser beam and the plasma arc act on the same molten pool during a welding process, which is intended to ensure prominent complete cladding of a back side of a joint while improving a welding speed. The TIG arc is arranged in the back to ensure a beautiful welding seam with a high purity. This patent provides a prominent laser+plasma arc+TIG arc combined welding method.

The Chinese patent 2019104306288 discloses a method for applying a composite wear-resistant alloy coating to a surface of a metallurgic roller. In the method, raw materials of an inner coating and an outer coating are sprayed on a surface of a substrate by a laser-plasma composite heat source-based spraying technology to produce a coating with excellent wear and corrosion resistance and high hardness. In addition, the coating has a strong bonding strength to the substrate, a low porosity, and a long service life. The Chinese patent 2020103897527 discloses a laser-plasma composite energy field deposition method for preparing a cobalt-based gradient high-temperature wear-resistant and anti-friction coating. The composite deposited coating includes the following three functionally-gradient material layers: a bottom layer, an intermediate transition layer, and a surface functional layer. When the laser-plasma composite energy field deposition method is adopted to prepare a coating, the plasma spraying is conducted first, and then the laser scanning cladding and lapping is conducted to prepare a coating with a much-higher density and much-better wear and corrosion resistance than a coating prepared by the plasma spraying technology.

The above-mentioned patents each integrate the respective advantages of a plasma and a laser to obtain a high-quality and high-efficiency cladding layer or a welding and cutting structure. However, because a laser-plasma composite nozzle has a complicated structure or because a laser-plasma combined welding/cutting process or a plasma spraying-laser remelting combined process is complicated, the practical application of the above patents is limited.

SUMMARY

In view of the problems that non-ferrous metal components such as copper, aluminum, magnesium, and titanium used for structural light-weighting, multifunctionality, or the like have a low hardness and poor wear resistance themselves, there are a low light absorption rate and a low efficiency when the non-ferrous metal components are strengthened by laser cladding, and there are a small cladding depth and a large deformation when the non-ferrous metal components are strengthened by plasma cladding, the present disclosure provides a laser-plasma composite cladding head and a composite cladding method. In the present disclosure, a laser-plasma composite high-energy beam can be formed to combine a high accuracy of laser cladding with a high efficiency of plasma cladding and improve the cladding performance and surface quality of a powder, such that a surface of a non-ferrous metal such as copper, aluminum, magnesium, and titanium can undergo cladding strengthening with a high efficiency and a high quality to obtain a metallurgically-bonded cladding layer with a large thickness.

By adjusting a structure of a laser-plasma composite cladding head, a ring laser beam can encapsulate a plasma beam to produce a "laser-encapsulated plasma beam", such that the ring laser beam surrounds the plasma beam, which reduces a temperature gradient from a center to an edge of the composite beam and controls the uniformity of a cladding depth. In addition, a plasma beam can encapsulate a laser beam to produce a "plasma-encapsulated laser beam", such that the plasma beam surrounds the laser beam to produce a large beam spot and the peripheral plasma beam plays a role in preheating the laser beam, which expands a cladding width, reduces a residual stress of a cladding layer, and is conducive to improving the stress corrosion resistance of a cladding layer. By adjusting a power and a beam spot diameter of a laser, a current, a voltage, and a beam spot diameter of a plasma beam, a cladding speed, a powder-feeding rate, and a lap rate and selecting a molten metal powder or a ceramic phase powder according to specific needs, a cladding layer with desired corrosion, wear, impact, and ablation resistance, a controllable thickness, a prominent surface quality, and few defects can be obtained, which solves the surface protection problem for a large number of non-ferrous metal components used in extreme environments.

To allow the above objective, the present disclosure adopts the following technical solutions:

In a first aspect, the present disclosure provides a laser-plasma composite cladding head, including: an optical fiber port, a water-cooling port, a collimating lens, an upper tapered lens, a lower tapered lens, an upper roof lens, a left 45° reflective lens, a powder-feeding port, an anode-protective nozzle, a flange-arranging plate, a tungsten electrode-protective cap, a tungsten electrode, a tungsten electrode-centering member, a cathode water-cooled cable interface, a cathode insulating member, a right 45° reflective lens, a lower roof lens, a concentrating lens, a protective lens, an anode insulating member, a central ionized gas, a wire-feeding port, an anode water-cooled cable interface, an anode nozzle, and a shielding gas, where the shielding gas is generally an inert gas;

a divergent laser beam transmitted by an optical fiber from a laser enters through the optical fiber port and is collimated through the collimating lens to produce a collimated laser beam, and then the collimated laser beam diverges through the upper tapered lens and the lower tapered lens to produce a ring laser beam; the ring laser beam first passes through the left 45° reflective lens to make a first optical path change by 90°, and then passes through the upper roof lens such that the ring laser beam is split into two half-ring laser beams to leave a gap for avoiding the tungsten electrode; the two half-ring laser beams pass through the right 45° reflective lens to make a second optical path change by 90°, such that a direction of the second optical path is coaxial with a direction of the tungsten electrode; the two half-ring laser beams are contracted through the lower roof lens to produce a complete ring laser beam, thereby allowing a coaxial output of the ring laser beam and a plasma beam; the complete ring laser beam is finally concentrated towards an outlet of the anode nozzle through the concentrating lens and the protective lens; a function of the protective lens is to prevent a smoke and a splash generated during a cladding process from moving upwards to contaminate and damage the upper lenses such as the concentrating lens and the collimating lens; and the central ionized gas is ionized between the anode nozzle and the tungsten electrode to produce a variable polarity plasma arc, then the variable polarity plasma arc is transferred to a position between the tungsten electrode and a workpiece to produce a plasma arc, and the plasma arc is mechanically compressed through a central hole of the anode nozzle to produce a plasma beam with a high energy density.

When the plasma arc passes through the central hole of the anode nozzle (the central hole is a channel for water-cooling of the anode nozzle), because a ratio L/D of a length L to a diameter D of the central hole is greater than 4, a cross section of the plasma arc is constrained and the plasma arc cannot be expanded freely. Under an action of argon at a specified pressure and flow rate, a cold gas flow evenly surrounds the plasma arc, such that a periphery of the plasma arc is strongly cooled, a charged particle flow (ions and electrons) is forced to be concentrated towards a center of an arc column, and the arc column is further compressed. In addition, under an action of a magnetic field generated by a current of the arc column itself, an electromagnetic force generated makes the arc column further contracted. After the above three compression effects, the energy of the plasma arc is highly concentrated in an arc column with a very small diameter, and a gas in the arc column is fully ionized into a plasma. The diameter of the central hole of the anode nozzle determines a diameter and an energy density of the plasma beam. The larger the diameter of the central hole, the larger the diameter of the plasma beam, the wider the cladding, and correspondingly, the lower the energy density.

Preferably, the tungsten electrode-centering member is powered and cooled through the cathode water-cooled cable interface, and serves as a cathode generating a plasma; the tungsten electrode-protective cap is configured to protect the tungsten electrode and seal the central ionized gas to avoid the leakage of the central ionized gas from a top; the anode nozzle is powered and cooled through the anode water-cooled cable interface, and serves as an anode generating a plasma; and the anode-protective nozzle is arranged outside the anode nozzle.

As connectors for the laser-plasma composite cladding head, the cathode water-cooled cable interface and the anode water-cooled cable interface play the following two roles: 1. Introducing positive and negative electricities (the positive electricity corresponds to the anode water-cooled cable interface and the negative electricity corresponds to the cathode water-cooled cable interface). 2. Allowing the circulation of a cooling water channel (inlet water and return water).

Preferably, the cathode is insulated from a body of the laser-plasma composite cladding head through the cathode insulating member; and the anode is insulated from the body of the laser-plasma composite cladding head through the anode insulating member.

Preferably, the flange-arranging plate is arranged on the body of the laser-plasma composite cladding head, and the tungsten electrode-protective cap and the tungsten electrode-centering member both are connected with the flange-arranging plate; and a central hole allowing the tungsten electrode to pass through is formed in each of the right 45° reflective lens, the lower roof lens, the concentrating lens, and the protective lens.

Preferably, a plurality of powder-feeding ports and a plurality of wire-feeding ports are provided, and a powder fed by the plurality of powder-feeding ports and the plurality of wire-feeding ports forms a smooth and dense cladding layer.

In the present disclosure, a plurality of water-cooling ports are also provided.

Preferably, the optical fiber port is configured to adjust upper and lower positions of a laser focus with an adjustment range of #15 mm.

In a second aspect, the present disclosure provides a composite cladding method of the laser-plasma composite cladding head. At the outlet of the anode nozzle, a ring laser beam and a plasma beam interact with each other. Generally, when a single laser beam is irradiated on surfaces of a metal powder and a substrate, the metal is instantaneously vaporized to produce a metal vapor flowing above a molten pool, the metal vapor is broken through by a laser beam to produce a laser-produced plasma, and the laser beam is absorbed, refracted, and scattered by the laser-produced plasma, which reduces a utilization rate of energy of the laser beam in melting the powder and the metal substrate. When the laser and plasma beams in the present disclosure together act on a same region, a low-density plasma in the plasma beam dilutes the laser-produced plasma to reduce an inhibition effect of the laser-produced plasma on the laser beam and improve the utilization rate of energy of the laser beam. In addition, under an action of an electromagnetic contraction force of the plasma beam, charged particles in a plasma beam column tend to move towards an axis of the plasma beam column, and hot spots generated by a laser action on a surface of a base metal attract the plasma beam column, such that the directionality and stiffness of the plasma beam column both are improved. Compared with a small cladding zone of a single laser heat source, a combination of a laser beam and a plasma beam also expands a thermal action range, and can melt an increased amount of a metal and allow a large amount of a powder fed for cladding to produce a large cladding thickness and cladding depth, improve an efficiency, and reduce a deformation.

The composite cladding method includes: melting a powder synchronously fed by the plurality of powder-feeding ports and the plurality of wire-feeding ports to form a smooth and dense cladding layer, where the upper and lower positions of the laser focus are adjusted through the optical fiber port to adjust a cladding relationship of the plasma beam and the ring laser beam;

when the laser focus is at an upper position, the ring laser beam at the outlet of the anode nozzle is small, and in this case, a "plasma-encapsulated laser beam" situation is presented on a processing surface of the workpiece, that is, the plasma beam encapsulates the ring laser beam; and when the laser focus is at a lower position, the ring laser beam at the outlet of the anode nozzle is large, and in this case, a "laser-encapsulated plasma beam" situation is presented on the processing surface of the workpiece, that is, the ring laser beam encapsulates the plasma beam.

Preferably, when the laser-plasma composite cladding head produces a laser-plasma composite high-energy beam for cladding, the laser-plasma composite high-energy beam is in the following two forms: the "plasma-encapsulated laser beam" generated by encapsulating the ring laser beam with the plasma beam or the "laser-encapsulated plasma beam" generated by encapsulating the plasma beam with the ring laser beam; the "plasma-encapsulated laser beam" or "the laser-encapsulated plasma beam" is allowed by adjusting a position of the laser focus; and a diameter and an energy density of the plasma beam are adjusted by adjusting the diameter of the central hole of the anode nozzle. A ring laser beam can encapsulate a plasma beam to produce a "laser-encapsulated plasma beam", such that the ring laser beam surrounds the plasma beam, which reduces a temperature gradient from a center to an edge of the composite beam and controls the uniformity of a cladding depth. In addition, a plasma beam can encapsulate a laser beam to produce a "plasma-encapsulated laser beam", such that the plasma beam surrounds the laser beam to produce a large beam spot and the peripheral plasma beam plays a role in preheating the laser beam, which expands a cladding width, reduces a residual stress of a cladding layer, and is conducive to improving the stress corrosion resistance of a cladding layer. During an actual cladding process with the "plasma-encapsulated laser beam" generated by encapsulating the laser beam with the plasma beam, the laser beam continuously stirs a molten pool under an action of the plasma beam to break dendrite structures in the molten pool to allow microstructure refinement and component homogenization, and also makes a gas float up to reduce a porosity. In addition, the cladding performance and surface quality of a powder can be improved, and a plasma beam at a periphery of the composite beam plays a role of preheating the laser beam, which expands a cladding width, reduces a residual stress of a cladding layer, and is conducive to improving the stress corrosion resistance of a cladding layer.

Any content not detailed in the present disclosure can refer to the prior art.

The present disclosure has the following beneficial effects:

Compared with the existing laser cladding and plasma cladding, the present disclosure designs a coaxial composite beam of a laser beam and a plasma beam for cladding, which can integrate the advantages of laser cladding and plasma cladding and overcome the respective limitations of laser cladding and plasma cladding. Compared with the existing laser+plasma cladding, the present disclosure adopts both coaxial compounding and synchronous powder-feeding, and allows the two forms of "plasma-encapsulated laser beam" and "laser-encapsulated plasma beam" by adjusting a laser focus.

The high-efficiency and high-quality cladding strengthening of the present disclosure is allowed by a laser-plasma composite beam, which expands a thermal action range. The present disclosure can melt an increased amount of a metal powder and allow a large amount of a powder fed for cladding to produce a large cladding thickness and cladding depth and improve an efficiency. A ring laser beam can encapsulate a plasma beam to produce a "laser-encapsulated plasma beam", such that the ring laser beam surrounds the plasma beam, which reduces a temperature gradient from a center to an edge of the composite beam and controls the uniformity of a cladding depth. In addition, a plasma beam can encapsulate a laser beam to produce a "plasma-encapsulated laser beam", such that the plasma beam surrounds the laser beam to produce a large beam spot and the peripheral plasma beam plays a role in preheating the laser beam, which expands a cladding width, reduces a residual stress of a cladding layer, and is conducive to improving the stress corrosion resistance of a cladding layer. During an actual cladding process with the "plasma-encapsulated laser beam" generated by encapsulating the laser beam with the plasma beam, the laser beam continuously stirs a molten pool under an action of the plasma beam to break dendrite structures in the molten pool to allow microstructure refinement and component homogenization, and also makes a gas float up to reduce a porosity. In addition, the cladding performance and surface quality of a powder can be improved, and a plasma beam at a periphery of the composite beam plays a role of preheating the laser beam, which expands a cladding width, further reduces a residual stress of a cladding layer, and is conducive to preparing a cladding layer with a low stress, few defects, and a prominent surface quality.

The present disclosure combines a high accuracy of laser cladding with a high efficiency of plasma cladding to conduct cladding strengthening with high efficiency and high quality for a surface of a non-ferrous metal such as copper, aluminum, magnesium, and titanium to produce a metallurgically-bonded cladding layer with a thickness of 0.5 mm to 5 mm. A laser-plasma composite cladding layer has a hardness of 50 HRC to 65 HRC. According to needs, a cladding layer with desired corrosion, wear, impact, and ablation resistance, a controllable thickness, a prominent surface quality, and few defects can be obtained, which solves the surface protection problem for a large number of non-ferrous metal components used in extreme environments.

The present disclosure is especially suitable for large-thickness cladding with a large fed powder amount, and can improve the cladding performance and surface quality of a powder.

BRIEF DESCRIPTION OF THE DRAWINGS

The accompany drawings of the specification constituting a part of the present application provide further understanding of the present application. The schematic embodiments of the present application and description thereof are intended to be illustrative of the present application and do not constitute an undue limitation of the present application.

In the figures, 1: an optical fiber port, 2: a water-cooling port, 3: a collimating lens, 4: an upper tapered lens, 5: a lower tapered lens, 6: an upper roof lens, 7: a left 45° reflective lens, 8: a ring laser beam, 9: a powder-feeding port, 10: an anode-protective nozzle, 11: a flange-arranging plate, 12: a tungsten electrode-protective cap, 13: a tungsten electrode, 14: a tungsten electrode-centering member, 15: a cathode water-cooled cable interface, 16: a cathode insulating member, 17: a right 45° reflective lens, 18: a lower roof lens, 19: a concentrating lens, 20: a protective lens, 21: an anode insulating member, 22: a central ionized gas, 23: a wire-feeding port, 24: an anode water-cooled cable interface, 25: an anode nozzle, 26: a shielding gas, 27: a laser-plasma composite beam, and 28: a workpiece.

DETAILED DESCRIPTION OF THE EMBODIMENTS

In order to make those skilled in the art well understand the technical solutions in the specification, the technical solutions in the embodiments of the specification are clearly and completely described below in conjunction with the accompanying drawings in the embodiments of the specification, but are not limited thereto. Those not described in detail in the present disclosure are the conventional techniques in the art.

Example 1

Figure 1:
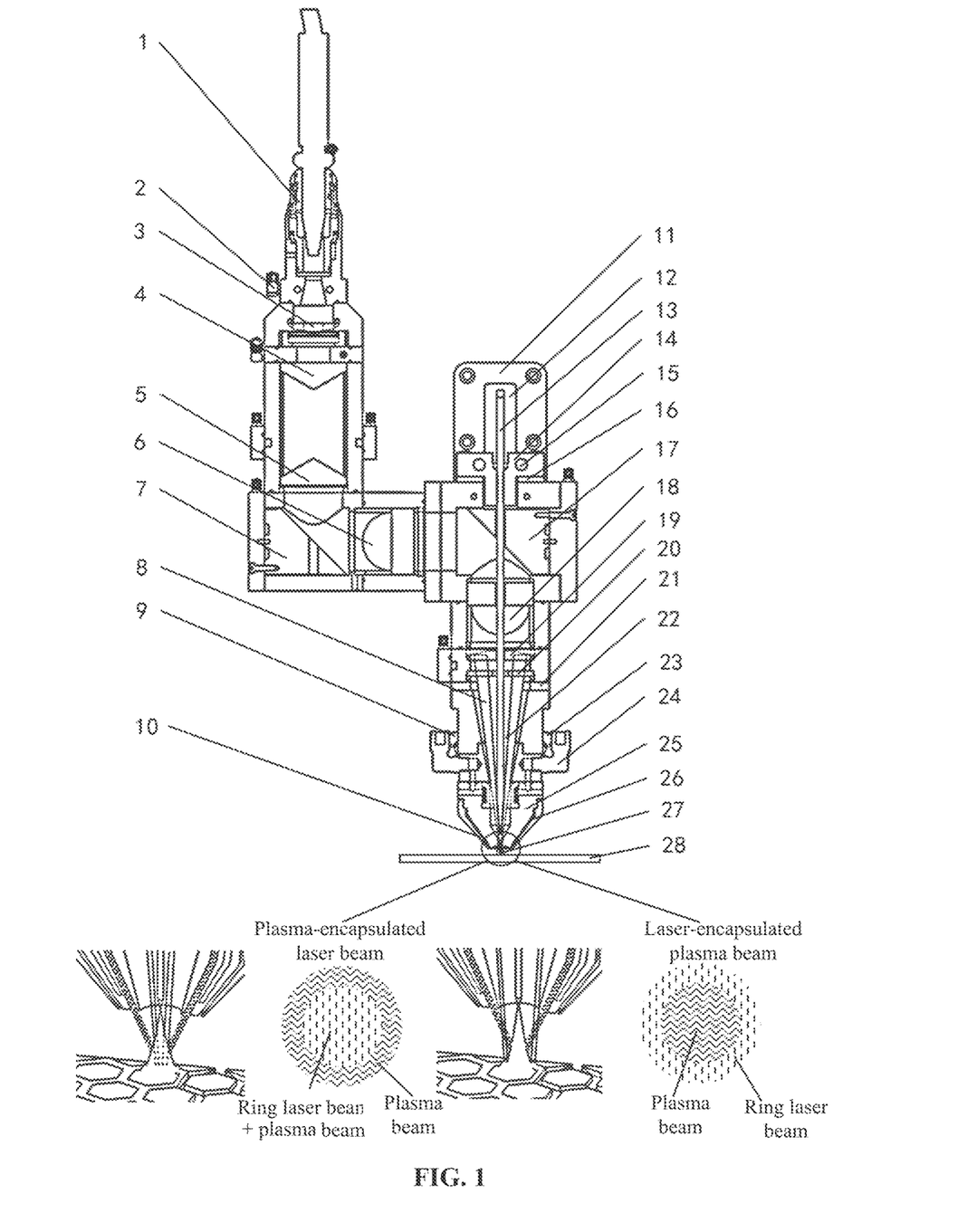
FIG. 1 is a schematic diagram of the laser-plasma composite cladding head, the "plasma-encapsulated laser beam", and the "laser-encapsulated plasma beam" in the present disclosure.

A laser-plasma composite cladding head is provided, as shown in FIG. 1, including: an optical fiber port 1, a water-cooling port 2, a collimating lens 3, an upper tapered lens 4, a lower tapered lens 5, an upper roof lens 6, a left 45° reflective lens 7, a powder-feeding port 9, an anode-protective nozzle 10, a flange-arranging plate 11, a tungsten electrode-protective cap 12, a tungsten electrode 13, a tungsten electrode-centering member 14, a cathode water-cooled cable interface 15, a cathode insulating member 16, a right 45° reflective lens 17, a lower roof lens 18, a concentrating lens 19, a protective lens 20, an anode insulating member 21, a central ionized gas 22, a wire-feeding port 23, an anode water-cooled cable interface 24, an anode nozzle 25, and a shielding gas 26. The shielding gas 26 is generally an inert gas.

A divergent laser beam transmitted by an optical fiber from a laser enters through the optical fiber port 1 and is collimated through the collimating lens 3 to produce a collimated laser beam. Then the collimated laser beam diverges through the upper tapered lens 4 and the lower tapered lens 5 to produce a ring laser beam. The ring laser beam first passes through the left 45° reflective lens 7 to make a first optical path change by 90°, and then passes through the upper roof lens 6 such that the ring laser beam is split into two half-ring laser beams to leave a gap for avoiding the tungsten electrode 13. The two half-ring laser beams pass through the right 45° reflective lens 17 to make a second optical path change by 90°, such that a direction of the second optical path is coaxial with a direction of the tungsten electrode. The two half-ring laser beams are contracted through the lower roof lens 18 to produce a complete ring laser beam 8, thereby allowing a coaxial output of the ring laser beam and a plasma beam. The complete ring laser beam is finally concentrated towards an outlet of the anode nozzle through the concentrating lens 19 and the protective lens 20. A function of the protective lens is to prevent a smoke and a splash generated during a cladding process from moving upwards to contaminate and damage the upper lenses such as the concentrating lens and the collimating lens.

The central ionized gas 22 is ionized between the anode nozzle 25 and the tungsten electrode 13 to produce a variable polarity plasma arc, then the variable polarity plasma arc is transferred to a position between the tungsten electrode and a workpiece to produce a plasma arc, and the plasma arc is mechanically compressed through a central hole of the anode nozzle to produce a plasma beam with a high energy density.

When the plasma arc passes through the central hole of the anode nozzle (the central hole is a channel for water-cooling of the anode nozzle), because a ratio L/D of a length L to a diameter D of the central hole is greater than 4, a cross section of the plasma arc is constrained and the plasma arc cannot be expanded freely. Under an action of argon at a specified pressure and flow rate, a cold gas flow evenly surrounds the plasma arc, such that a periphery of the plasma arc is strongly cooled, a charged particle flow (ions and electrons) is forced to be concentrated towards a center of an arc column, and the arc column is further compressed. In addition, under an action of a magnetic field generated by a current of the arc column itself, an electromagnetic force generated makes the arc column further contracted. After the above three compression effects, the energy of the plasma arc is highly concentrated in an arc column with a very small diameter, and a gas in the arc column is fully ionized into a plasma. The diameter of the central hole of the anode nozzle determines a diameter and an energy density of the plasma beam. The larger the diameter of the central hole, the larger the diameter of the plasma beam, the wider the cladding, and correspondingly, the lower the energy density.

The tungsten electrode-centering member 14 is powered and cooled through the cathode water-cooled cable interface 15, and serves as a cathode generating a plasma. The tungsten electrode-protective cap 12 is configured to protect the tungsten electrode and seal the central ionized gas to avoid the leakage of the central ionized gas from a top. The anode nozzle 25 is powered and cooled through the anode water-cooled cable interface, and serves as an anode generating a plasma. The anode-protective nozzle 10 is arranged outside the anode nozzle.

As connectors for the laser-plasma composite cladding head, the cathode water-cooled cable interface and the anode water-cooled cable interface play the following two roles: 1. Introducing positive and negative electricities (the positive electricity corresponds to the anode water-cooled cable interface and the negative electricity corresponds to the cathode water-cooled cable interface). 2. Allowing the circulation of a cooling water channel (inlet water and return water).

The cathode is insulated from a body of the laser-plasma composite cladding head through the cathode insulating member 16.

The anode is insulated from the body of the laser-plasma composite cladding head through the anode insulating member 21.

The flange-arranging plate 11 is arranged on the body of the laser-plasma composite cladding head. The tungsten electrode-protective cap 12 and the tungsten electrode-centering member 14 both are connected with the flange-arranging plate 11.

A central hole allowing the tungsten electrode to pass through is formed in each of the right 45° reflective lens 17, the lower roof lens 18, the concentrating lens 19, and the protective lens 20.

A plurality of powder-feeding ports 9 and a plurality of wire-feeding ports 23 are provided. A powder fed by the plurality of powder-feeding ports and the plurality of wire-feeding ports forms a smooth and dense cladding layer.

A plurality of water-cooling ports are also provided.

The optical fiber port 1 is configured to adjust upper and lower positions of a laser focus with an adjustment range of #15 mm.

Example 2

A composite cladding method of the laser-plasma composite cladding head is provided. At the outlet of the anode nozzle 25, a ring laser beam and a plasma beam interact with each other to produce a laser-plasma composite beam 27. Generally, when a single laser beam is irradiated on surfaces of a metal powder and a substrate, the metal is instantaneously vaporized to produce a metal vapor flowing above a molten pool, the metal vapor is broken through by a laser beam to produce a laser-produced plasma, and the laser beam is absorbed, refracted, and scattered by the laser-produced plasma, which reduces a utilization rate of energy of the laser beam in melting the powder and the metal substrate. When the laser and plasma beams in the present disclosure together act on a same region, a low-density plasma in the plasma beam dilutes the laser-produced plasma to reduce an inhibition effect of the laser-produced plasma on the laser beam and improve the utilization rate of energy of the laser beam. In addition, under an action of an electromagnetic contraction force of the plasma beam, charged particles in a plasma beam column tend to move towards an axis of the plasma beam column, and hot spots generated by a laser action on a surface of a base metal attract the plasma beam column, such that the directionality and stiffness of the plasma beam column both are improved. Compared with a small cladding zone of a single laser heat source, a combination of a laser beam and a plasma beam also expands a thermal action range, and can melt an increased amount of a metal and allow a large amount of a powder fed for cladding to produce a large cladding thickness and cladding depth, improve an efficiency, and reduce a deformation.

The composite cladding method includes: a powder synchronously fed by the plurality of powder-feeding ports and the plurality of wire-feeding ports is melted to form a smooth and dense cladding layer. The upper and lower positions of the laser focus are adjusted through the optical fiber port to adjust a cladding relationship of the plasma beam and the ring laser beam.

When the laser focus is at an upper position, the ring laser beam at the outlet of the anode nozzle is small, and in this case, a "plasma-encapsulated laser beam" situation is presented on a processing surface of the workpiece 28, that is, the plasma beam encapsulates the ring laser beam. When the laser focus is at a lower position, the ring laser beam at the outlet of the anode nozzle 25 is large, and in this case, a "laser-encapsulated plasma beam" situation is presented on the processing surface of the workpiece 28, that is, the ring laser beam encapsulates the plasma beam.

Figure 2:
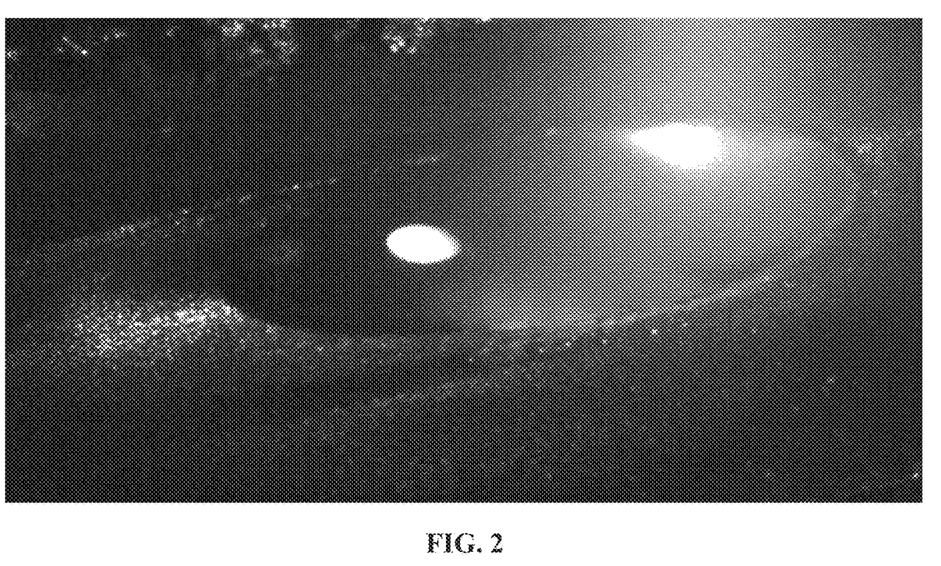
FIG. 2 shows a real-time observation result of a molten pool for the "plasma-encapsulated laser beam"
Figure 3:
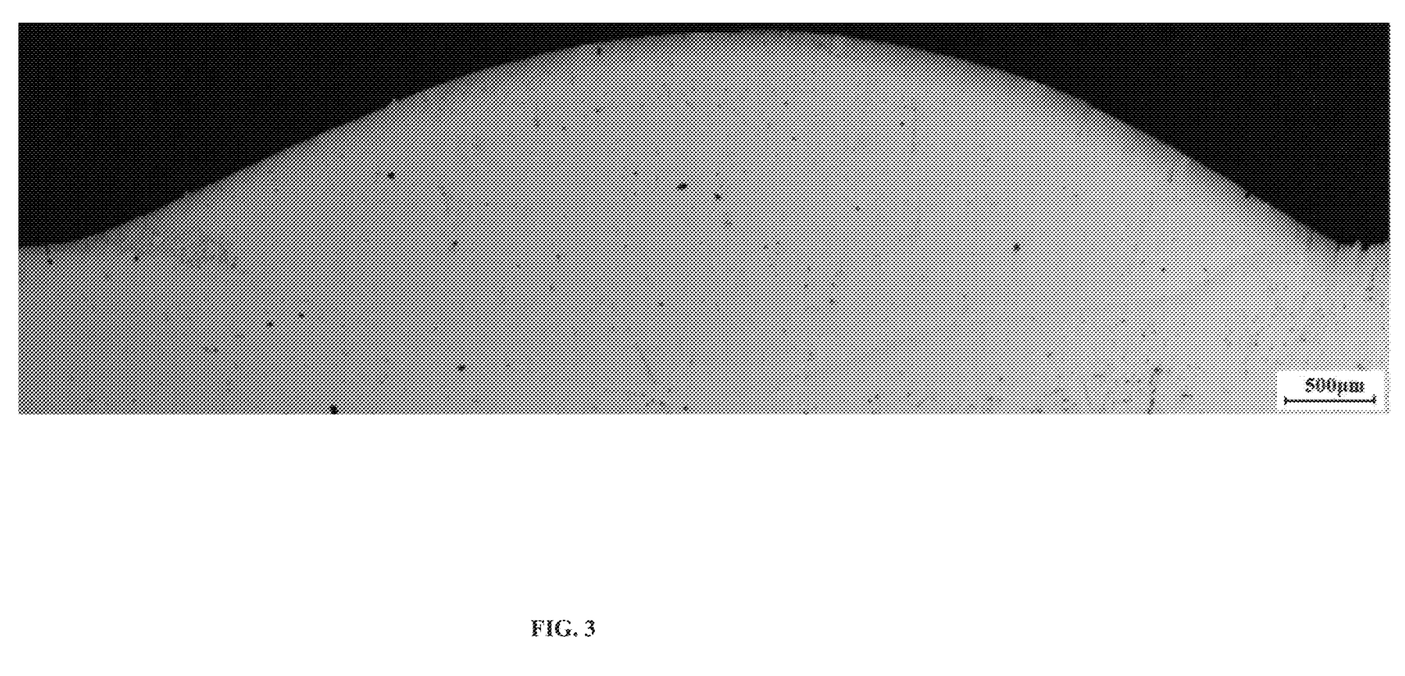
FIG. 3 shows a cross-sectional structure of a laser-plasma composite cladding layer.
Figure 4:
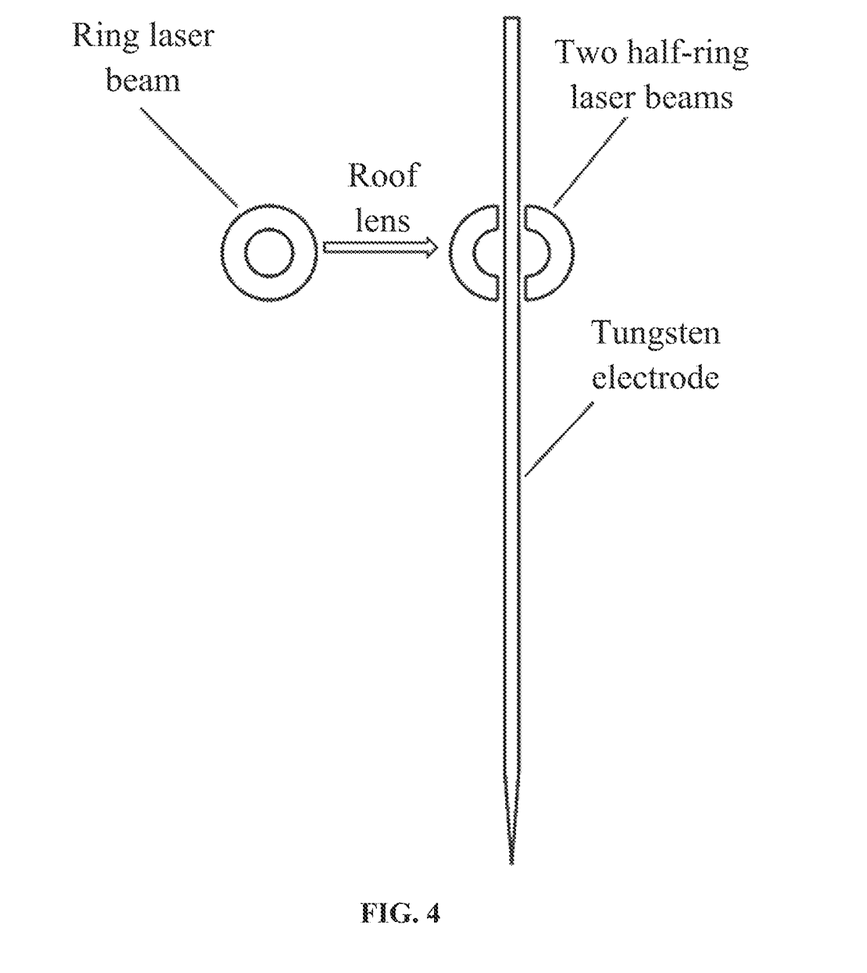
FIG. 4 is a schematic diagram of the splitting of a ring laser beam into two half-ring laser beams by a roof lens.

When the laser-plasma composite cladding head produces a laser-plasma composite high-energy beam for cladding, the laser-plasma composite high-energy beam is in the following two forms: the "plasma-encapsulated laser beam" generated by encapsulating the ring laser beam with the plasma beam or the "laser-encapsulated plasma beam" generated by encapsulating the plasma beam with the ring laser beam. The "plasma-encapsulated laser beam" or "the laser-encapsulated plasma beam" is allowed by adjusting a position of the laser focus. A diameter and an energy density of the plasma beam are adjusted by adjusting the diameter of the central hole of the anode nozzle. A ring laser beam can encapsulate a plasma beam to produce a "laser-encapsulated plasma beam", such that the ring laser beam surrounds the plasma beam, which reduces a temperature gradient from a center to an edge of the composite beam and controls the uniformity of a cladding depth. In addition, a plasma beam can encapsulate a laser beam to produce a "plasma-encapsulated laser beam", such that the plasma beam surrounds the laser beam to produce a large beam spot and the peripheral plasma beam plays a role in preheating the laser beam, which expands a cladding width, reduces a residual stress of a cladding layer, and is conducive to improving the stress corrosion resistance of a cladding layer. During an actual cladding process with the "plasma-encapsulated laser beam" generated by encapsulating the laser beam with the plasma beam, as shown in FIG. 2, the laser beam continuously stirs a molten pool under an action of the plasma beam to break dendrite structures in the molten pool to allow microstructure refinement and component homogenization, and also makes a gas float up to reduce a porosity. In addition, the cladding performance and surface quality of a powder can be improved, and a plasma beam at a periphery of the composite beam plays a role of preheating the laser beam, which expands a cladding width, reduces a residual stress of a cladding layer, and is conducive to improving the stress corrosion resistance of a cladding layer. A cross-sectional structure of the cladding layer is shown in FIG. 3. It can be seen from FIG. 3 that the cladding layer has a bottom width of larger than 10 mm and a thickness of larger than 2 mm, the cladding layer is wider and thicker than a cladding layer prepared by the traditional laser cladding, and the cladding layer has a larger cladding depth than a cladding layer prepared by single plasma cladding. Moreover, an upper contour of the cladding layer is continuous and smooth, indicating that the powder has excellent cladding performance and a prominent surface quality. The present disclosure makes full use of the advantages of the two heat sources and an interaction between the two heat sources, and perfectly solves the respective limitations of laser cladding and plasma cladding.

By adjusting a power and a beam spot diameter of a laser (the beam spot diameter is adjusted by adjusting a position of a focus, the beam spot diameter is the minimum when the focus is on a surface of a workpiece, and the spot divergence increases when there are positive and negative focus shifts), a current, a voltage, and a beam spot diameter of a plasma beam, a cladding speed, a powder-feeding rate, and a lap rate (the lap rate refers to an overlap between two cladding belts) and selecting a molten metal powder or a ceramic phase powder according to specific needs, a metallurgically-bonded cladding layer with a controllable thickness of 0.5 mm to 5 mm, a hardness of 50 HRC to 65 HRC, desired corrosion, wear, impact, and ablation resistance, a prominent surface quality, and few defects can be obtained, which solves the surface protection problem for a large number of non-ferrous metal components used in extreme environments.

The above are preferred implementations of the present disclosure. It should be noted that a person of ordinary skill in the art may further make several improvements and modifications without departing from the principle of the present disclosure, but such improvements and modifications should also be deemed as falling within the protection scope of the present disclosure.

What is claimed is:
1. A laser-plasma composite cladding head, comprising:
an optical fiber port receives a divergent laser beam transmitted by an optical fiber from a laser,
a collimating lens collimates the divergent laser beam to produce a collimated laser beam;
an upper tapered lens,
a lower tapered lens, the collimated laser beam diverging through the upper tapered lens and the lower tapered lens to produce a ring laser beam;
an upper roof lens,
a left 45° reflective lens,
a tungsten electrode, the ring laser beam first passes through the left 45° reflective lens to make a first optical path change by 90°, and then passes through the upper roof lens such that the ring laser beam is split into two half-ring laser beams to leave a gap for avoiding the tungsten electrode;
a right 45° reflective lens, the two half-ring laser beams pass through the right 45° reflective lens to make a second optical path change by 90°, such that a direction of the second optical path is coaxial with a direction of the tungsten electrode;
a lower roof lens configured to contract the two half-ring laser beams to produce a complete ring laser beam;
a concentrating lens,
a protective lens,
a central ionized gas, and
an anode nozzle having an outlet, where the complete ring laser beam is finally concentrated towards the outlet of the anode nozzle through the concentrating lens and the protective lens,
wherein the central ionized gas is ionized between the anode nozzle and the tungsten electrode to produce a variable polarity plasma arc, then the variable polarity plasma arc is transferred to a position between the tungsten electrode and a workpiece to produce a plasma arc, and the plasma arc is mechanically compressed through a central hole of the anode nozzle to produce a plasma beam with a high energy density.

2. The laser-plasma composite cladding head according to claim 1, further comprising:
- a water-cooling port;
- a powder-feeding port;
- an anode-protective nozzle;
- a flange-arranging plate;
- a tungsten electrode-protective cap;
- a tungsten electrode-centering member;
- a cathode water-cooled cable interface;
- a cathode insulating member;
- an anode insulating member;
- a wire-feeding port,
- an anode water-cooled cable interface, and
- a shielding gas.

3. The laser-plasma composite cladding head according to claim 2, further comprising the tungsten electrode-centering member configured to be powered and cooled through the cathode water-cooled cable interface, and serves as a cathode generating a plasma, the tungsten electrode-protective cap is configured to protect the tungsten electrode and seal the central ionized gas to avoid the leakage of the central ionized gas from a top; the anode nozzle is powered and cooled through the anode water-cooled cable interface, and serves as an anode generating a plasma; and the anode-protective nozzle is arranged outside the anode nozzle.

4. The laser-plasma composite cladding head according to claim 3, wherein the cathode is insulated from a body of the laser-plasma composite cladding head through the cathode insulating member; and
the anode is insulated from the body of the laser-plasma composite cladding head through the anode insulating member.

5. The laser-plasma composite cladding head according to claim 4, wherein the flange-arranging plate is arranged on the body of the laser-plasma composite cladding head, and the tungsten electrode-protective cap and the tungsten electrode-centering member both are connected with the flange-arranging plate; and further comprising
a central hole allowing the tungsten electrode to pass through is formed in each of the right 45° reflective lens, the lower roof lens, the concentrating lens, and the protective lens.

6. The laser-plasma composite cladding head according to claim 5, wherein a ratio L/D of a length L to a diameter D of the central hole of the anode nozzle is greater than 4.

7. The laser-plasma composite cladding head according to claim 6, wherein a plurality of powder-feeding ports and a plurality of wire-feeding ports are provided, and a powder fed by the plurality of powder-feeding ports and the plurality of wire-feeding ports forms a smooth and dense cladding layer.

8. The laser-plasma composite cladding head according to claim 7, wherein the optical fiber port is configured to adjust upper and lower positions of a laser focus with an adjustment range of ±15 mm.

9. A composite cladding method of the laser-plasma composite cladding head according to claim 8, comprising:
under an interaction of the ring laser beam and the plasma beam at the outlet of the anode nozzle, melting the powder synchronously fed by the plurality of powder-feeding ports and the plurality of wire-feeding ports to form the smooth and dense cladding layer, wherein the upper and lower positions of the laser focus are adjusted through the optical fiber port to adjust a cladding relationship of the plasma beam and the ring laser beam;
when the laser focus is at the upper position, the ring laser beam at the outlet of the anode nozzle is small, and a "plasma-encapsulated laser beam" situation is presented on a processing surface of the workpiece, that is, the plasma beam encapsulates the ring laser beam; and
when the laser focus is at the lower position, the ring laser beam at the outlet of the anode nozzle is large, and a "laser-encapsulated plasma beam" situation is presented on the processing surface of the workpiece, that is, the ring laser beam encapsulates the plasma beam.

10. The composite cladding method according to claim 9, wherein when the laser-plasma composite cladding head produces a laser-plasma composite high-energy beam for cladding, the laser-plasma composite high-energy beam is in the following two forms:
the "plasma-encapsulated laser beam" generated by encapsulating the ring laser beam with the plasma beam or the "laser-encapsulated plasma beam" generated by encapsulating the plasma beam with the ring laser beam; the "plasma-encapsulated laser beam" or "the laser-encapsulated plasma beam" is allowed by adjusting a position of the laser focus; and
a diameter and an energy density of the plasma beam are adjusted by adjusting the diameter of the central hole of the anode nozzle.

* * * * *